United States Patent [19]
Hoffmann

[11] 3,886,027
[45] May 27, 1975

[54] APPARATUS FOR CONNECTING OBTUSELY ABUTTING EDGES OF ONE OR MORE CUT-OUT PIECES OF MATERIAL IN A THREE-DIMENSIONAL MOULD

[75] Inventor: Richard Hoffmann, Stetten, Germany

[73] Assignee: BIMA Maschinenfabrik GmbH, Hechingen, Germany

[22] Filed: Mar. 6, 1973

[21] Appl. No.: 338,507

[30] Foreign Application Priority Data
Mar. 7, 1972 Germany............................ 2210923

[52] U.S. Cl. ............. 156/380; 156/272; 219/10.81; 219/215; 425/174.6
[51] Int. Cl. ............................................. B29c 3/00
[58] Field of Search ........... 156/245, 272, 274, 380, 156/500, 273; 12/DIG. 1, DIG. 2, 142 C, 142 F; 36/77 M; 219/10.53, 10.81, 215; 425/174, 174.4, 174.6, 174.8

[56] References Cited
UNITED STATES PATENTS

| | | | |
|---|---|---|---|
| 2,642,919 | 6/1953 | Kingman | 156/272 |
| 3,281,302 | 10/1966 | Kreh et al. | 156/380 |
| 3,671,709 | 6/1972 | Gidge | 156/274 |
| 3,684,620 | 8/1972 | Hoffmann | 156/380 |

*Primary Examiner*—Charles E. Van Horn
*Assistant Examiner*—Caleb Weston
*Attorney, Agent, or Firm*—Ernest G. Montague; Karl F. Ross; Herbert Dubno

[57] ABSTRACT

Toe caps for articles of footwear are made by cutting out a piece of synthetic resin sheet, introducing the sheet into an apparatus with upper and lower mold parts which press the synthetic resin into the required three-dimensional shape so that two edges of the toe cap abut together, and then welding edges together.

7 Claims, 6 Drawing Figures

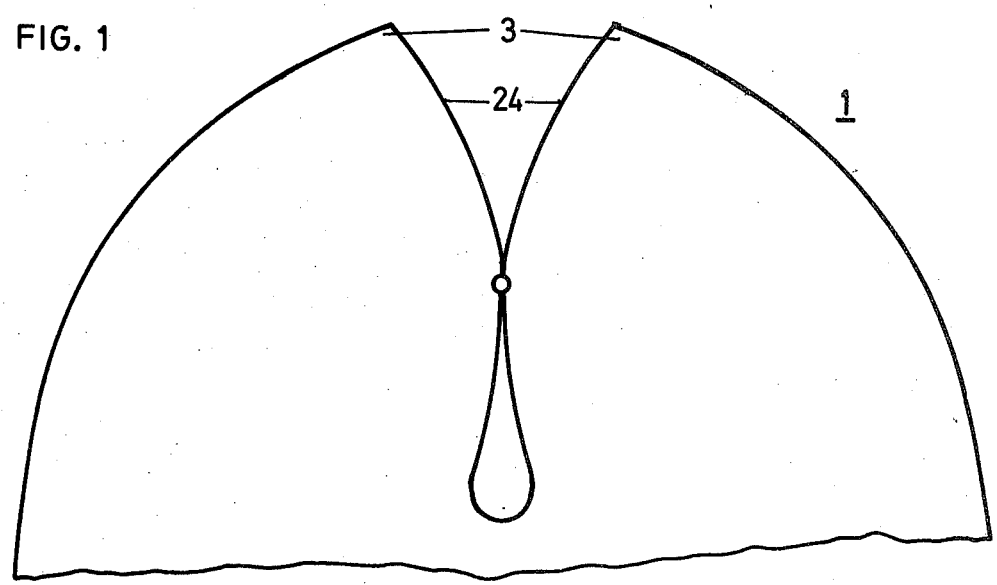
FIG. 1
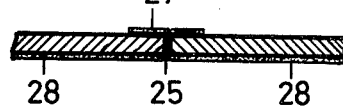
FIG. 3
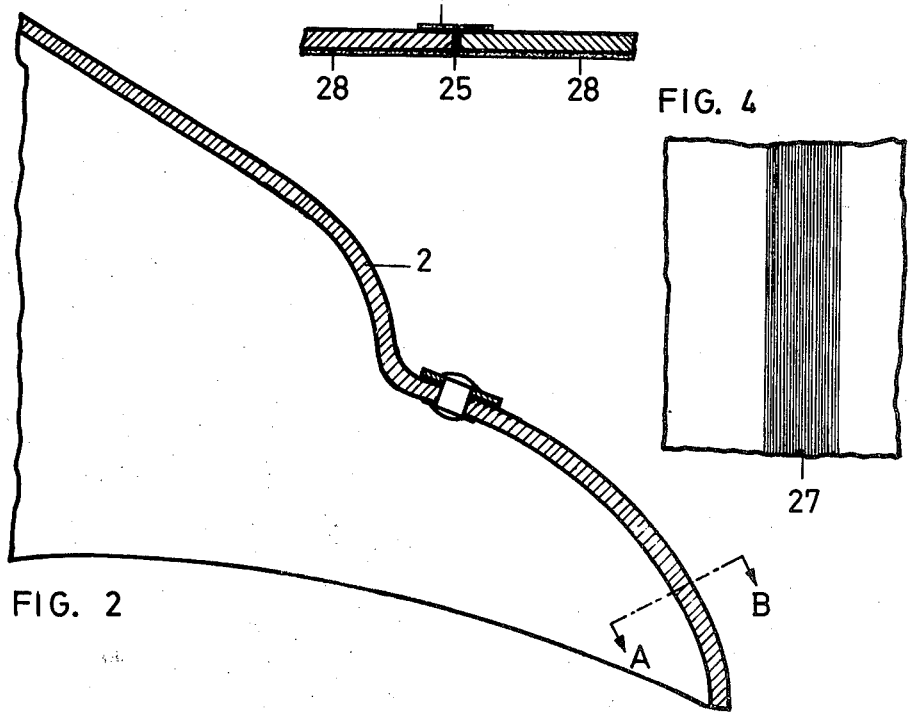
FIG. 2
FIG. 4

APPARATUS FOR CONNECTING OBTUSELY ABUTTING EDGES OF ONE OR MORE CUT-OUT PIECES OF MATERIAL IN A THREE-DIMENSIONAL MOULD

The invention relates to an apparatus for connecting obtusely abutting edges of one or more pieces of cut-out synthetic materials, for example artificial leather or the like, in a three-dimensional mold, for example front parts of shoes, edges of cases or containers, with simultaneous supply and application of a foil or strengthening band to the butt joint.

Owing to the non-stop pace in the development of welding techniques for connecting individual cut-out pieces of synthetic material and the like, the connecting together of individual cut-out pieces by means of sewing, more particularly in the case of the production of shoes of synthetic material, has been increasingly replaced by welding. Thus, today practically all operations on the shoe upper, in so far as it is a question of the connection of the parts required for the upper, have been taken over by welding operations. The sewing operations which still remain are only determined by fashion or are limited to parts which in accordance with generally held opinions of shoe manufacturers cannot be welded, something which especially applies for the front parts and toe caps of shoes. The particularly thick bulky workpiece part, which extends out of the surface plane, must for the sake of good appearance and in order not to have any steps or the like extending in an inward direction, which could jab into the foot of the wearer, be provided with obtusely abutting edges, which must fit together in a satisfactory manner, such edges being sewn together. Furthermore, a series of subsequent operations have to be carried out in order to avoid the entry of moisture or water even at the joint. In a conventional manner, therefore, these abutting edges are sewn together in zig-zag pattern and following this are provided with a covering strip or strap. In a different manner of connection the two parts are joined by means of staples and are covered with a plastic or steel band. These subsequent operations must be carried out particularly carefully in the case of the production of ski boots in order to ensure that water from melted snow cannot penetrate into the boot at the toe.

One aim of the invention is to provide a method which enables the welding not only of workpieces which in accordance with the prior art are laid in a flat manner alongside one another so that their edge portions to be connected together overlie, but also to make possible the welding together of cut pieces of material which extend out of the plane, that is to say are not flat, in the case of which the edge portions do not overlap and instead abut together in an obtuse manner.

Such joining together of pieces of material, more particularly for toe caps, always had to reckon with opposition from those skilled in the art on the ground that such a connection could not (owing to the comparatively thick and coarse material) withstand the extremely high tension and thrust forces to which it is exposed. Furthermore, it is a matter of great difficulty to hold the edges to be connected together during welding without causing them to slide relatively.

In accordance with the invention this object is attained by pressing the cut-out piece of material is pushed onto a corresponding convex three-dimensional lower mold while simultaneously bringing together the side edges to be connected together until they abut together obtusely with a thrust stress; following this a foil or reinforcing band with a preset length is supplied through the joint gap formed by the abutting edges and the two parts to be connected together are welded together at this joint position by suitable heat and pressure with the simultaneous application of the reinforcing band.

An apparatus for carrying out the method is characterised by a convex three-dimensional lower mold with a lower electrode provided substantially in the middle and a concave upper mold complementary in shape to the lower mold, means for lowering the upper mold onto the lower mould, an upper electrode corresponding in position to the lower electrode, and an advancing device for controlled supply of a foil or reinforcing band between the lower and upper electrode and between the upper electrode and the workpiece respectively.

BRIEF DESCRIPTION OF THE DRAWING

The invention is now described with reference to the accompanying drawings in detail. The drawings show an embodiment of the invention.

FIG. 1 shows a flat cut-out piece of material for the production of the front part or toe piece of a shoe.

FIG. 2 shows the shaped cut-out part, now having a three-dimensional shape, in accordance with FIG. 1 in section.

FIG. 3 shows a section A–B through the joint in accordance with FIG. 2.

FIG. 4 is a part view of the joining of the two pieces of material in plan view.

SPECIFIC DESCRIPTION

Figure 5:
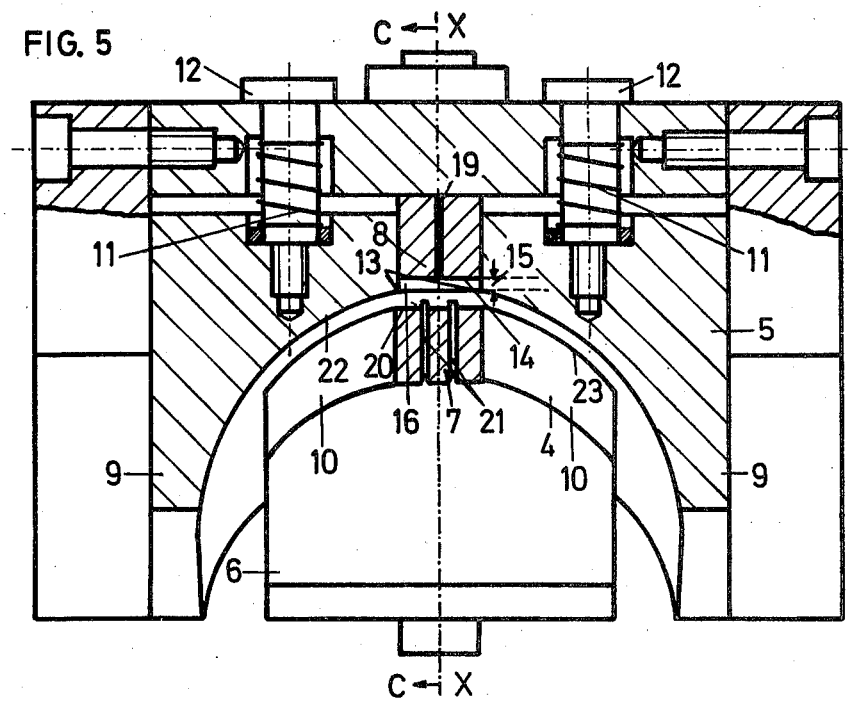
FIG. 5 is a front view of the device for connecting the cut-out pieces of material in a three-dimensional shape with obtusely abutting edges.
Figure 6:
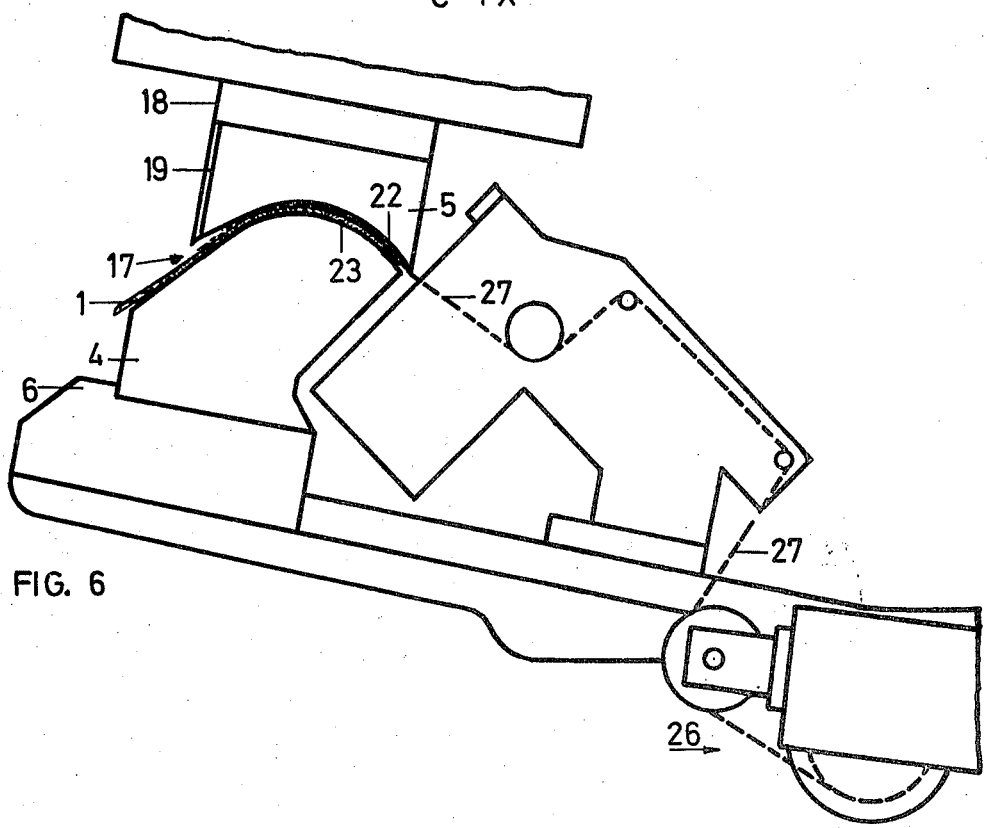
FIG. 6 shows a view in accordance with FIG. 5 on the section line C—C.

In FIG. 1 reference numeral 1 denotes a flat cut-out piece of material, which is to be shaped to form the toe cap 2 of a ski boot and whose obtusely abutting side edges are to be welded together in the toe zone 3. For this purpose the cut-out piece of material is operated upon in a device in accordance with FIGS. 5 and 6. This device consists chiefly of a convex three-dimensional lower mould 4 and a concave upper mould 5 which is arranged above it, can be moved down towards it and corresponds to it in shape. The convex mold at the same time forms a rest or abutment for the cut-out piece of material 1. It is fixed on a mold holder 6 in a removable manner and can be exchanged for another mould body if this should be required. In the same manner the upper mould 5 is carried on its holding means so that it can be removed and replaced by a mould body corresponding in shape as required. The moulds 4 and 5 each have an electrode in the middle, that is to say the convex three-dimensional mold 4 has an lower electrode 7 and the concave upper mold 5 has an upper electrode 8. The latter is capable of being moved in relation to the upper mold 5 in the axial direction X—X. The two molds 4 and 5 consist of two mold halves 9, 10, between which the electrodes 7 and 8 respectively lie and the electrodes form substantially a three-dimensional unit with the molds 4 and 5. The upper mold 5 is urged resiliently towards the lower mold 4 by means of springs 11, whose spring force can be set by stud-shaped setting screws 12. The two mold halves 9 of the upper mould so adjoin the upper electrode in the middle on both sides that in the starting position of the upper mold there is a space 15 between the two lower edges 13 of the mold halves 9 and the lower surface 14 of the upper electrode 8 and this space 15 forms a channel 16 in the upper mold. In an insertion opening 17 for the flat cut-out piece material 1 a so-called centering projection 19 is provided on the end face 18 of the upper electrode for bringing about precise introduction of the cut-out piece material while simultaneously centering of the abutting lateral edges, which are to be connected, with respect to the electrodes 7 and 8. Over a surface 20 of the lower electrode there projects a respective rib 21 on the lower electrode on both sides of the zone in which the butt joint, which is to be formed by the two pieces of material to be joined, is to lie and is arranged substantially at the same distance from it so as to run parallel to the butt joint in the working position.

The manner of operation of the device is as follows. For shaping the flat cut-out piece material 1 while simultaneously connecting the obtusely abutting side edges to form the toe cap of a ski boot, the cut-out piece material 1 with its toe zone 3 in front is pushed into the opening 17 of the device and pushed onto the convex three-dimensional lower mold. During this placing operation the lower surfaces 22 of the upper mold 5 lie with a constant spring stressing force respectively against one surface 23 of the piece of material 1 which has been introduced so that the parts which have to be connected together cannot slide or slip in relation to each other. Owing to the operation with the centering projection 19 the flat cut-out piece of material can be shaped so as to from a three-dimensional structure which is no longer flat and the two side edges 24, which are to be connected together, can be fitted together in a positive manner forming a smooth joint. As soon as the three-dimensional piece of material shaped to form a toe cap 2 satisfactorily lies on the lower mold for making the butt joint 25 a foil or reinforcing band 27 is fed by means of an advancing device 26 through the channel 16 between the lower surface of the upper electrode and the upper surface of the cut-out piece of material so as to cover the joint, a sufficient length as required of the band being so fed. In this prepared working position of the workpiece the upper electrode is moved downwards onto the workpiece towards the shaped piece of material 1 and at the same time the foil band 27 is cut off, and the spring pressure already present on the workpiece, of the two halves 9 of the upper mold is increased during the welding. Owing to this strong pressing action of the upper mold the workpiece by the two ribs 21, is pressed on the surface of the lower mould with the joint in a molten condition particularly at the blunt edges so that pieces of textile fabric 28 applied to the surface in a later operation stick thereto so as to be free from joints. The surface of the foil or reinforcing band 27, which is applied on welding the two material parts simultaneously at the butt joint 25 is given a pattern in the form of a ribed surface, see FIG. 4, owing to the upper electrode which can for example have a ribbed lower surface.

I claim:

1. An apparatus for welding a piece of material, comprising:
    a three-dimensional upwardly convex lower mold;
    a lower electrode received in said lower mold substantially in the middle thereof;
    a downwardly concave upper mold complementary to said lower mold in shape;
    means for lowering the upper mold toward the lower mold;
    an upper electrode received in said upper mold at a position corresponding to that of said lower electrode; and
    an advancing device for feeding a foil between said upper electrode and a piece of material lying on said lower mold.

2. The apparatus defined in claim 1 wherein said upper mold and said upper electrode are axially relatively slidable.

3. The apparatus defined in claim 1, further comprising spring means between said upper mold and said means for lowering said upper mold for spring-loading said upper mold toward said lower mold.

4. The apparatus defined in claim 1 wherein said upper mold comprises two mold halves flanking said upper electrode.

5. The apparatus defined in claim 1 wherein said upper electrode in an upper position thereof defines in said upper mold a channel below said upper electrode.

6. The apparatus defined in claim 1 wherein said upper electrode has an end face confronting said lower mold and formed with a centering projection for a piece of material to be disposed on said lower mold.

7. The apparatus defined in claim 1 wherein said lower electrode is formed on its face confronting said upper mold with a pair of spaced-apart ribs adapted to run parallel to a butt joint of a pair of material to be disposed on said lower mold and to be joined at said electrodes.

* * * * *